(12) United States Patent
Kishino

(10) Patent No.: US 6,526,537 B2
(45) Date of Patent: *Feb. 25, 2003

(54) STORAGE FOR GENERATING ECC AND ADDING ECC TO DATA

(75) Inventor: Tsuyoshi Kishino, Yamanashi (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,705

(22) Filed: Sep. 29, 1998

(65) Prior Publication Data

US 2002/0007476 A1 Jan. 17, 2002

(30) Foreign Application Priority Data

Sep. 29, 1997 (JP) ............................................. 9-263398

(51) Int. Cl.⁷ .............................................. G11C 29/00
(52) U.S. Cl. ....................................................... 714/763
(58) Field of Search ................. 714/36, 6, 5, 772–775, 714/762–763, 764, 7, 800, 11, 788; 365/189.01, 201, 200; 713/2; 707/202, 204; 360/26; 710/100, 129; 703/25, 27; 711/210

(56) References Cited

U.S. PATENT DOCUMENTS

| | | | | |
|---|---|---|---|---|
| RE30,187 E | * | 1/1980 | Hong et al. .................. | 714/758 |
| 4,377,862 A | * | 3/1983 | Koford et al. | |
| 4,486,882 A | * | 12/1984 | Piret et al. ................... | 375/267 |
| 4,841,513 A | | 6/1989 | Farhangi et al. ............... | 369/59 |
| 4,884,194 A | * | 11/1989 | Krol et al. ..................... | 714/11 |
| 4,905,242 A | | 2/1990 | Popp .......................... | 371/40.1 |
| 5,291,498 A | * | 3/1994 | Jackson et al. ............... | 714/758 |
| 5,313,624 A | * | 5/1994 | Harriman et al. .............. | 714/6 |
| 5,537,423 A | * | 7/1996 | Chen .......................... | 714/781 |
| 5,875,477 A | * | 2/1999 | Hasbun et al. ............... | 711/162 |
| 5,896,404 A | * | 4/1999 | Kellogg et al. .............. | 714/763 |
| 6,064,639 A | * | 5/2000 | Sako et al. .................... | 369/48 |
| 6,070,262 A | * | 5/2000 | Kellogg et al. ............. | 714/763 |
| 6,223,247 B1 | * | 4/2001 | Otsuka et al. ................. | 711/4 |

FOREIGN PATENT DOCUMENTS

| | | | | |
|---|---|---|---|---|
| CA | 1 209 269 | | 6/1986 | |
| JP | 57-055455 | | 4/1982 | ........... G06F/11/10 |
| JP | 55-1030146 A 55 | * | 4/1982 | ........... G06F/11/10 |
| JP | 55-100698 A | * | 6/1982 | ........... G11C/29/00 |
| JP | 57-100698 | | 6/1982 | ........... G11C/29/00 |
| JP | 61-177559 | * | 8/1986 | ........... G06F/12/16 |
| JP | 3-242745 | | 10/1991 | ........... G06F/12/16 |
| JP | 03292525 | * | 12/1991 | ............. G06F/3/06 |
| JP | 04370579 | * | 12/1992 | ........... G11B/20/12 |
| WO | 97/01138 | | 1/1997 | |

OTHER PUBLICATIONS

Kalter et al(A 50–ns 16–Mb DRAM with a 10–ns Data Rate And On–Chip ECC. IEEE, 1990).*
Schumacher(Memory Controller Design In VLSI. IEEE, 1989).*
Fieger et al(Transport Protocols Over Wireless Links. IEEE, 1997).*
Franaszec et al(On Variable Scope of Parity Protection In Disk Arrays. IEEE, 1997).*

* cited by examiner

Primary Examiner—Albert Decady
Assistant Examiner—Gay Lamarre
(74) Attorney, Agent, or Firm—Foley & Lardner

(57) ABSTRACT

A storage uses a memory device with a continuous transfer function as typified by an SRAM (Synchronous Random Access Memory) or a DRAM (Dynamic RAM) with an EDO (Extended Data Out). As for the detection/correction of data errors, the storage reduces, the ratio of the number of check bits to the number of data bits by effectively using a burst transfer function available with the memory device This allows a single memory device to recover from faults. This can be done with a device for dividing an ECC unit into a plurality of parts in a continuous transfer direction and writing one of them in the memory device at a time, and detecting/correcting the errors of data read out of the memory device while buffering them on an ECC basis.

8 Claims, 7 Drawing Sheets

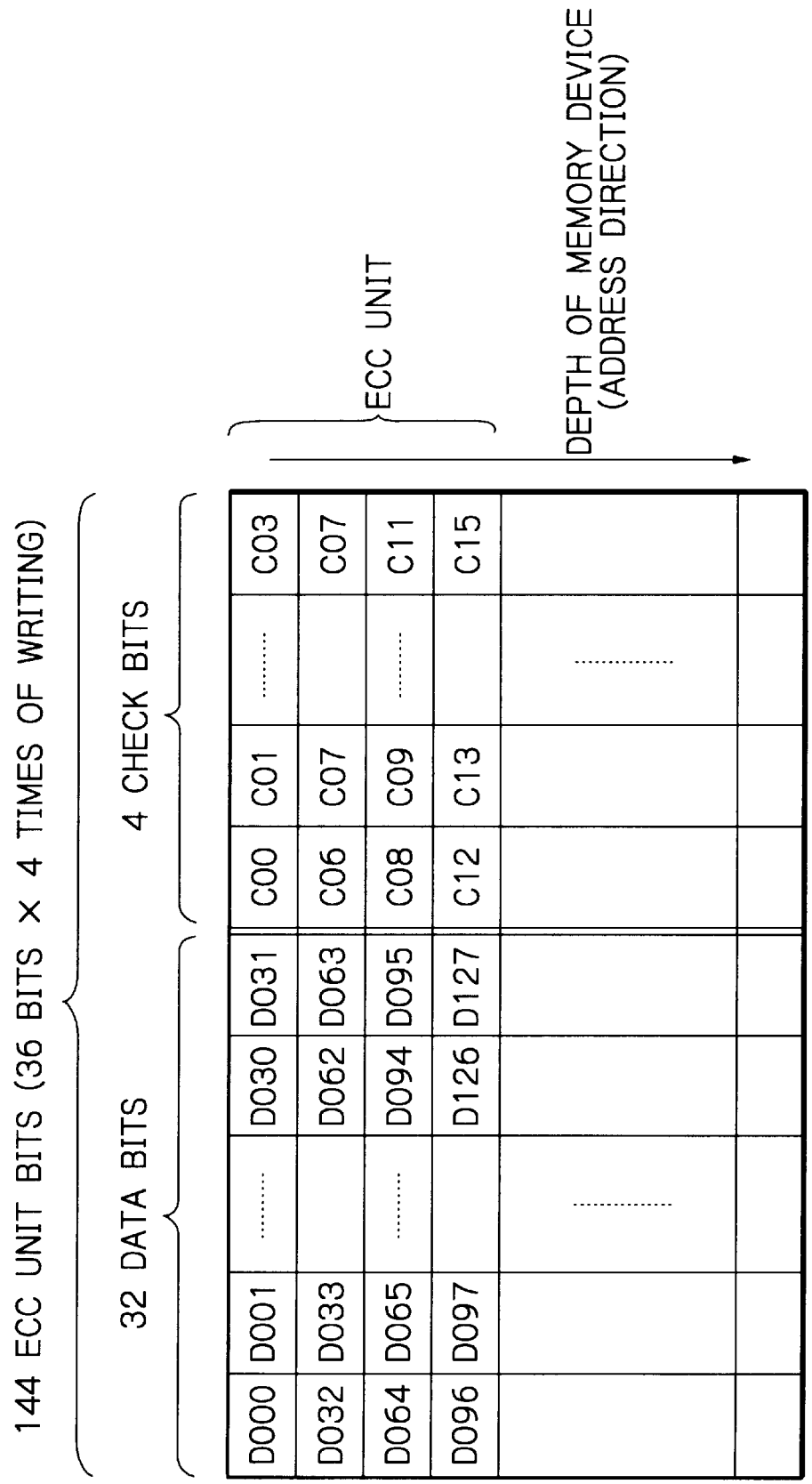

STORAGE FOR GENERATING ECC AND ADDING ECC TO DATA

BACKGROUND OF THE INVENTION

1. Field of the Invention

The present invention relates to storage using a memory device having a continuous transfer function as typified by an SRAM (Synchronous Random Access Memory) or a DRAM (Dynamic RAM) with EDO (Extended Data Out). More particularly, the present invention is concerned with a storage including means for generating a single ECC (Error Correcting Code) particular to data error control technologies for N read/write units and controlling error correction/detection.

2. Description of the Related Art

Semiconductor memory devices typified by DRAMs have customarily been used in computers and peripherals thereof for storing programs and/or computation data as needed. To store accurate data in a semiconductor memory device, it is a common practice to use an ECC system adding a preselected number of check bits necessary for an ECC to data bits, writing them in the memory device together, and detecting or correcting, based on the data bits and check bits, errors with an error detecting circuit at the time of data reading. Also, the ratio of the number of check bits to the number of data bits should preferably be reduced from the standpoint of the amount of hardware, i.e., the number of memory devices. In light of this, an ECC system generally referred to as SEC-DED (Single-bit Error Correction Double-bits Error Detection) is predominant over the other ECC systems.

Today, in parallel with the progress of semiconductor technologies, the capacity of a memory device is increasing while even personal computers are required to have a huge storage capacity. However, the unit storage capacity to be extended should preferably be as small as possible from the market needs and product standpoint Moreover, a current trend is toward a DRAM having multiple bits, e.g., four bits or eight bits, as distinguished from a single bit, for reducing the space and cost to be allocated to the DRAM. Fast data transfer to a memory device is another prerequisite in consideration of the increasing operation speed of a processor. To meet this requirement, a DRAM or an SDRAM with EDO capable of transferring data at a higher speed than the conventional DRAM has recently been developed.

However, when the number of bits of the memory device is increased, the conventional SEC-DED ECC system cannot recover a single memory device from all faults It is therefore necessary to increase the number of check bits for remedying aft the faults of a plurality of bits or to physically spread data via software such that the faults of a plurality of bits do not overlap in a single ECC. The data spreading scheme is taught in Japanese Patent Laid-Open Publication No. 61-177559. However, the former scheme is not practicable without resorting to a prohibitive number of bits in the error correction theory aspect, resulting in an increase in hardware (number of memory devices) for storing data consisting of data bits and check bits.

Why the number of memory devices increases with an increase in the number of check bits (ECC) is as follows. A relation between the number of data bits and the number of check bits necessary for an ECC function, as determined by the ECC code theory, is as follows. Every condition shown below is well known in the art.

| Item No. | Number of Data Bits | Number of Check Bits | ECC Function |
|---|---|---|---|
| 1 | 32 bits | 7 bits | 1 bit for error correction/2 bits for error detection (SEC-DED) |
| 2 | 64 bits | 8 bits | same as above |
| 3 | 64 bits | 12 bits | nearby 2 bits for error correction/4 bits for error detection (S2ED-D2ED) |
| 4 | 128 bits | 16 bits | nearby 4 bits for error correction/8 bits for error detection (S4EC-D4ED) |

As listed above, although the number of check bits necessary for implementing the same ECC function increases with an increase in the number of data bits, the ratio of the number of check bits to the number of data bits decreases (compare item Nos. 1 and 2). Even when the number of data bits and the ECC correcting function are doubled or quadrupled, the number of check bits is less than double or quadruple, respectively. As a result, efficiency is improved with respect to the error detecting/correcting function (compare item Nos. 1, 3 and 4).

However, the above conventional technologies have the following problems left unsolved. To detect or correct the errors of a plurality of bits with an ECC, there must be increased the amount of hardware (number of memory devices) to be allocated to the check bits. Specifically, the detection/correction of the errors of a plurality of bits is not practicable without resorting to check bits, i.e., hardware (number of memory devices) great enough to accommodate such a number of check bits. On the other hand, when the physical spreading of data using software is used to detect the faults of a plurality of bits with SEC-DED, the transfer ability of the storage falls while the hardware of an error control circuit increases. This is because overhead occurs at the time of data transfer due to the intermediary of software and because exclusive hardware is necessary for the data to be spread.

SUMMARY OF THE INVENTION

It is therefore an object of the present invention to provide a storage using an SDRAM, DRAM with. EDO or similar memory device having a continuous transfer function.

It is another object of the present invention to provide a storage capable of reducing, in the correction/detection of errors of data with an ECC, the ratio of check bits to data bits and thereby reducing the required number of memory devices as far as possible white remedying the fault of a single memory whose number of bits is increasing.

In accordance with the present invention, in a storage capable of generating an ECC for data and adding the ECC to the data to thereby form a read/write unit, an ECC is generated for each N of the data, equally divided into N ECC code parts and then respectively added to the N data to thereby constitute read/write units, The read/write units are continuously written and read out of N continuous addresses of a memory device.

Also, in accordance with the present invention, a storage capable of generating an ECC for data and adding the ECC to the data to thereby form a read/write unit includes a writing circuit for generating an ECC for N of write data received from a host, adding Nequally divided ECC code parts to the Nwrite data, respectively, to thereby form Nwrite units, and writing the N write units to N continuous addresses of a semiconductor memory device, respectively. A reading circuit gathers the Nequally divided ECC code parts contained in read data units read out of the N continuous addresses of the semiconductor memory device to thereby reconstruct the ECC, and corrects errors of the N read data units with the reconstructed ECC.

BRIEF DESCRIPTION OF THE DRAWINGS

The above and other objects, features and advantages of the present invention will become apparent from the following detailed description taken with the accompanying drawings in which:

FIG. 7 shows a specific arrangement of data stored in the memory device (four times of continuous transfer)

DESCRIPTION OF THE PREFERRED EMBODIMENT

Figure 1:
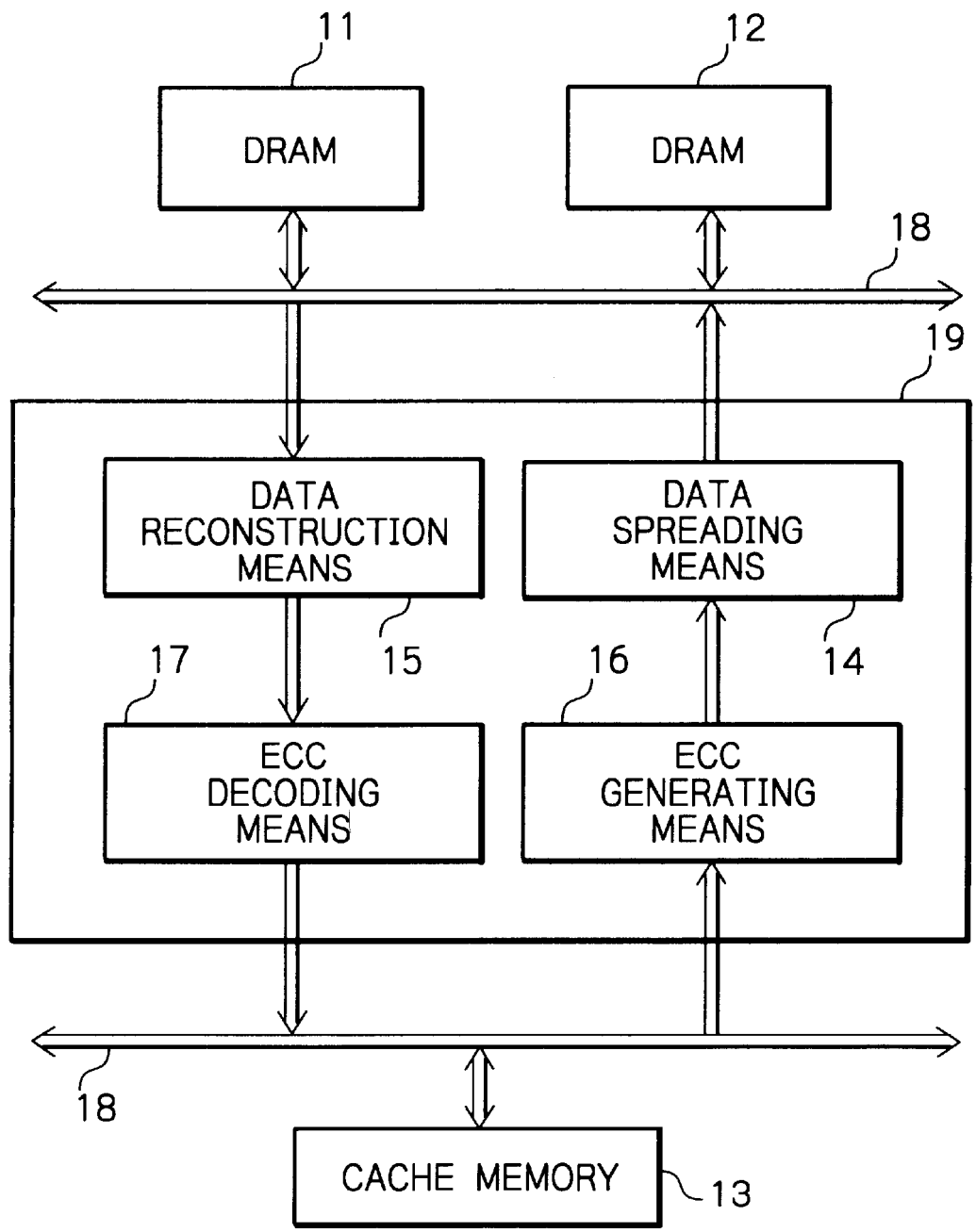
FIG. 1 is a block diagram schematically showing a conventional system.

FIG. 1 of the drawings shows the conventional system taught in Japanese Patent Laid-Open Publication No. 61-177539 mentioned earlier, i.e., the system physically spreading stored data with a software scheme in order to prevent the faults of a plurality of bits from overlapping in a single ECC. As shown, the system includes data spreading means 14 and data reconstructing means 15 each being implemented by a ROM (Read Only Memory). The two means 14 and 15 each stores a table listing address data designating the physical storage locations of data.

Figure 2:
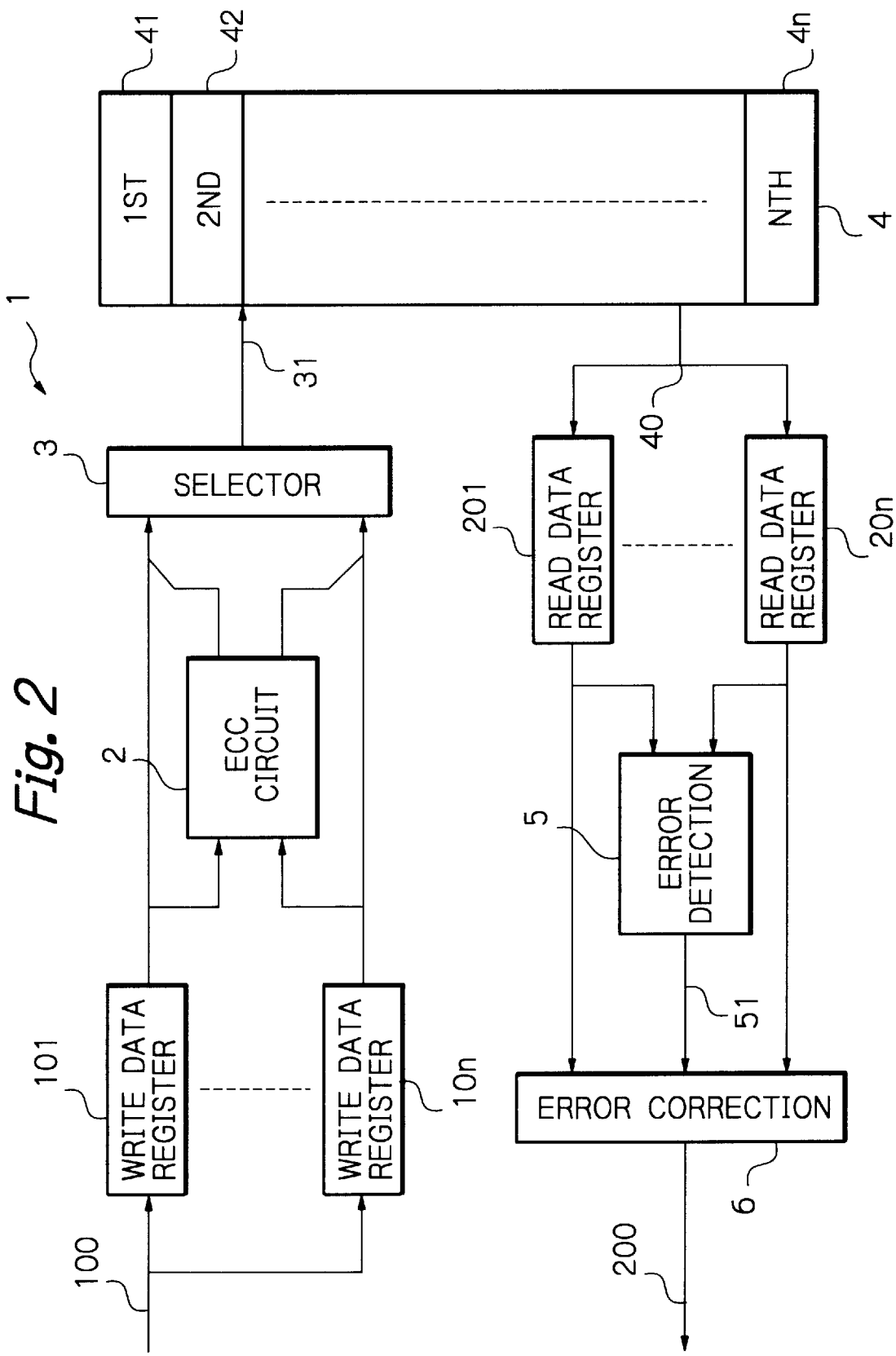
FIG. 2 is a block diagram schematically showing a storage embodying the present invention.

Referring to FIG. 2, a storage embodying the present invention is shown and generally designated by the reference numeral 1. As shown, the storage 1 includes write data registers 101-10n for holding, for a preselected period of time, N of write data 100 input from a&host to the storage 1. The data output from the write data registers 101-10n are applied to an ECC circuit 2. The ECC circuit 2 generates an ECC for implementing an ECC function while holding the ECC for a preselected period of time. A selector 3 receives the data output from the write data registers 101-10n and Nequally divided ECC parts output from the ECC circuit 2. In response, the selector 3 outputs write data 31 in accordance with a continuous writing function available with a memory device 4. The memory device 4 stores Ncontinuous write data 31, one at a timer in its "first time" 41 to "Nth time" 4n, respectively. Read data registers 201-20n receives data 40 read out of the memory device 4 and hold Nread data 40 for a preselected period of time. An error detection 5 gathers the Nequally divided ECC parts present in the data output from the read data registers 201-20n to thereby reconstruct a single ECC. The error detection 5 detects error bits out of the Nread data by using the above reconstructed ECC and holds error bit information for a preselected period of time. The error bit information is fed to an error correction 6 together with the data bits of the read data registers 201-20n. In response, the error correction 6 corrects the data bit on the basis of the error bit information and then outputs Nread data 200.

Figure 3:
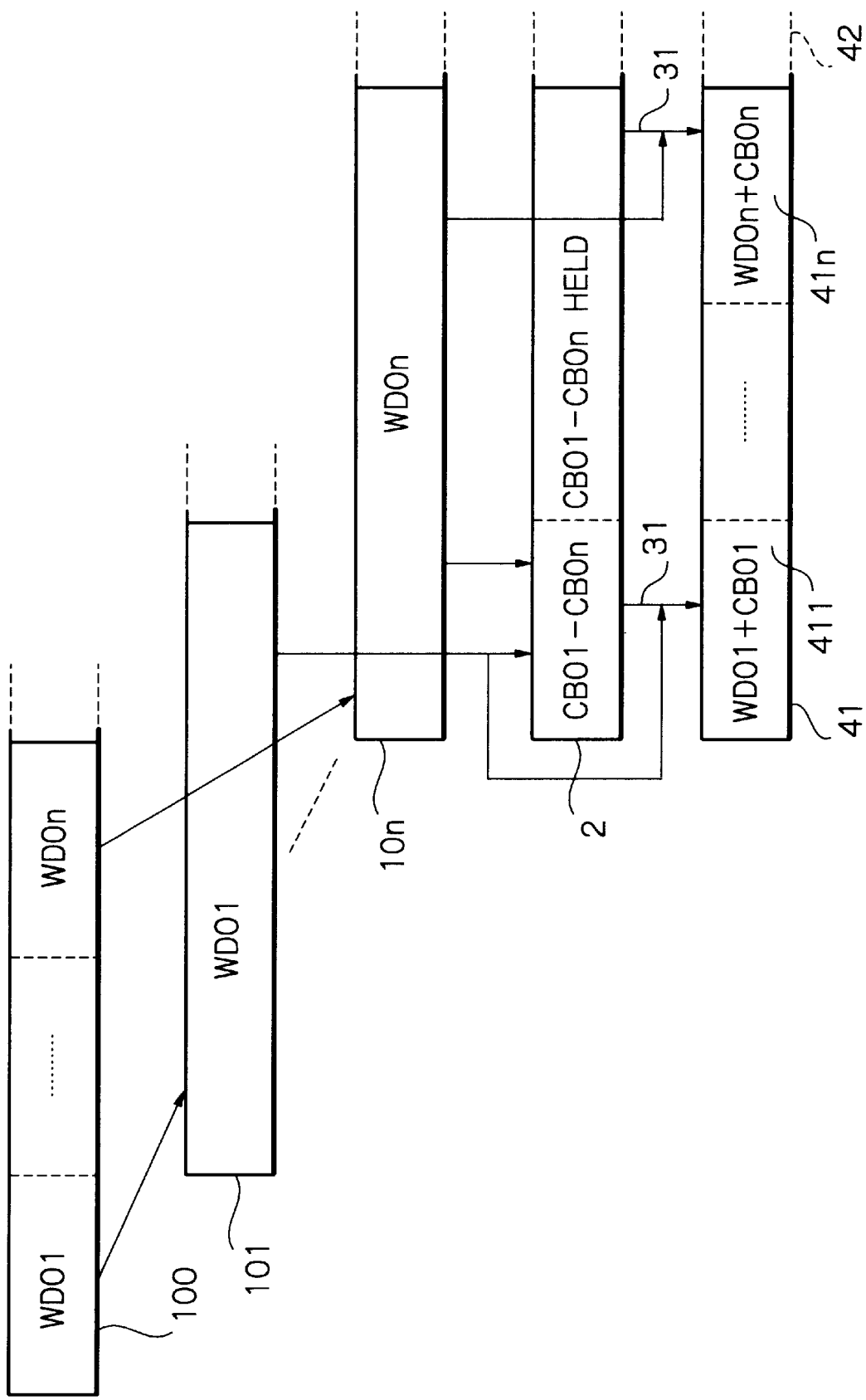
FIGS. 3 and 4 are timing charts respectively showing a reading procedure and a writing procedure unique to the illustrative embodiment.

A specific operation of the illustrative embodiment will be described with reference to FIGS. 3 and 4. As shown in FIG. 3, a sequence of write data 100 (WD01-WD0n) received from the host are sequentially input to the write data registers 101-10n. The write data registers 101-10n respectively hold the input data WD01-WD0n for a preselected period of time.

When the data written to the write data registers 101-10n reach a preselected number of data bits corresponding to a single ECC allocated to Ndata, the ECC circuit 2 generates an ECC covering all of the data bits for executing the ECC function. The ECC circuit 2 holds ECC check bits for a preselected period of time. At this instant, all the data bits and check bits to be written to the memory device 4 are determined. The ECC circuit 2 therefore equally divides all of the data and check bits into Nparts to thereby form Nunits to be written. The ECC circuit 2 sequentially writes the Nunits, one at a time, to the "1st time" 41 to the "Nth time" 4n of the memory device 4 via the selector 3 by using the continuous transfer function.

As soon as a single ECC is generated by the ECC circuit 2, the write data registers 101-10n can start storing the next write data 100 corresponding to another ECC By repeating such a procedure, the storage 1 is capable of continuously inputting write data in the memory device 4.

Figure 4:
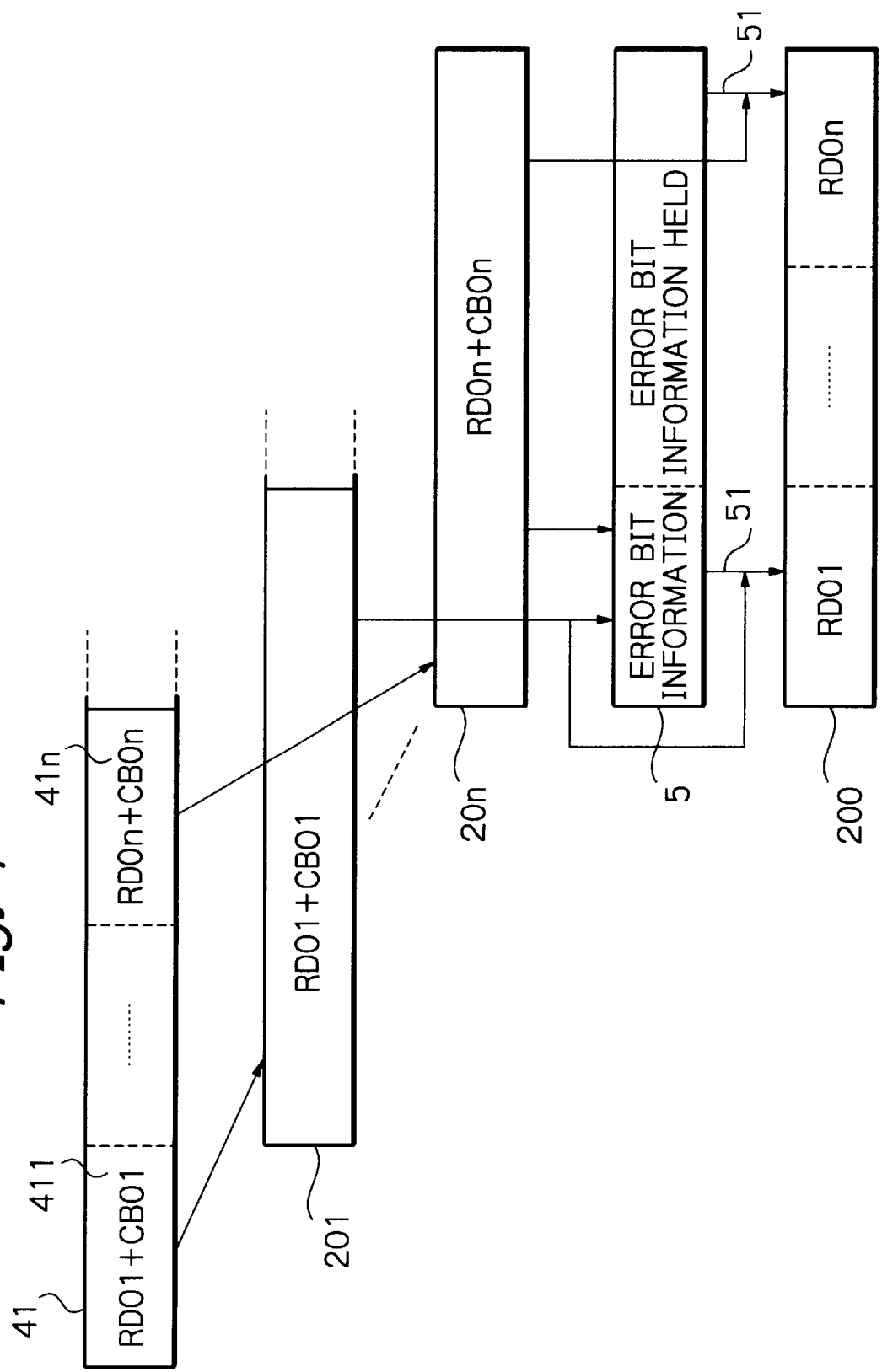

FIG. 4 demonstrates a data reading procedure. As shown, a sequence of data 40, labeled 411-41n in FIG. 4, read out of the memory device 4 one by one are sequentially written to the read data registers 201-20n, respectively. Specifically, the data 411-41n respectively consist of N equally divided data bit parts 411-41n and Nequally divided ECC parts in the same manner as at the time of data reading. The registers 201-20n store the data bit parts 411-41n and ECC parts for a preselected period of time.

The error detection 5 determines, with the preselected ECC function, whether or act any error exists in the data bits or the check bits output from the read data registers 201 and 20n. If any correctable error exists in the data bits or the check bits, then the error detection 5 holds bit information relating to the error for a preselected period of time. The error correction 6 corrects, based an the error bit information held in the error detection 5, an erroneous data bit and then sends Ndata RD01-RD0n to the host as read data 200.

The principle of error correction particular to the illustrative embodiment is as follows. Data are continuously transferred to a memory device on an ECC basis and stored in the continuous addresses of the memory device. With this procedure, it is possible to reduce the ratio of the check bits to the ECC-based data bits which has been clarified in the code theory aspect. A specific reduction of hardware (number of memory devices) achievable with the illustrative embodiment is shown below, taking SEC-DED as an example.

| Read/Write System | Number of Data Bits | Number of Check Bits | ECC system | Number of Memory Cells for Unit Read/ Write Length |
|---|---|---|---|---|
| 1 Time of Continuous Transfer | 32 bits | 7 bits | SEC-DED*1 | 39 |
| 2 Times of Continuous Transfer | 64 bits | 12 bits | S2EC-D2ED*2 | 38 |
| 4 Times of Continuous Transfer | 128 bits | 16 bits | S4EC-D4ED*3 | 36 |

Why the ECC system changes in accordance with the number of times of continuous transfer is as follows. Assuming one time of continuous transfer particular to the conventional system *1, the fault of a single memory device has influence on only one bit. By contrast, the influence of the above fault extends over two bits in the case of two times of continuous transfer *2 or even over 4 bits in the case of four times of continuous transfer *3. Therefore, to preserve an ECC function (recovery of a Single memory device from a fault) equivalent to one available with one time of continuous transfer, two consecutive bits and four consecutive bits must be fully corrected in the case of two times of transfer and in the case of four times of transfer, respectively. This will be described more specifically hereinafter with reference to FIGS. 5, 6 and 7.

Figure 5:
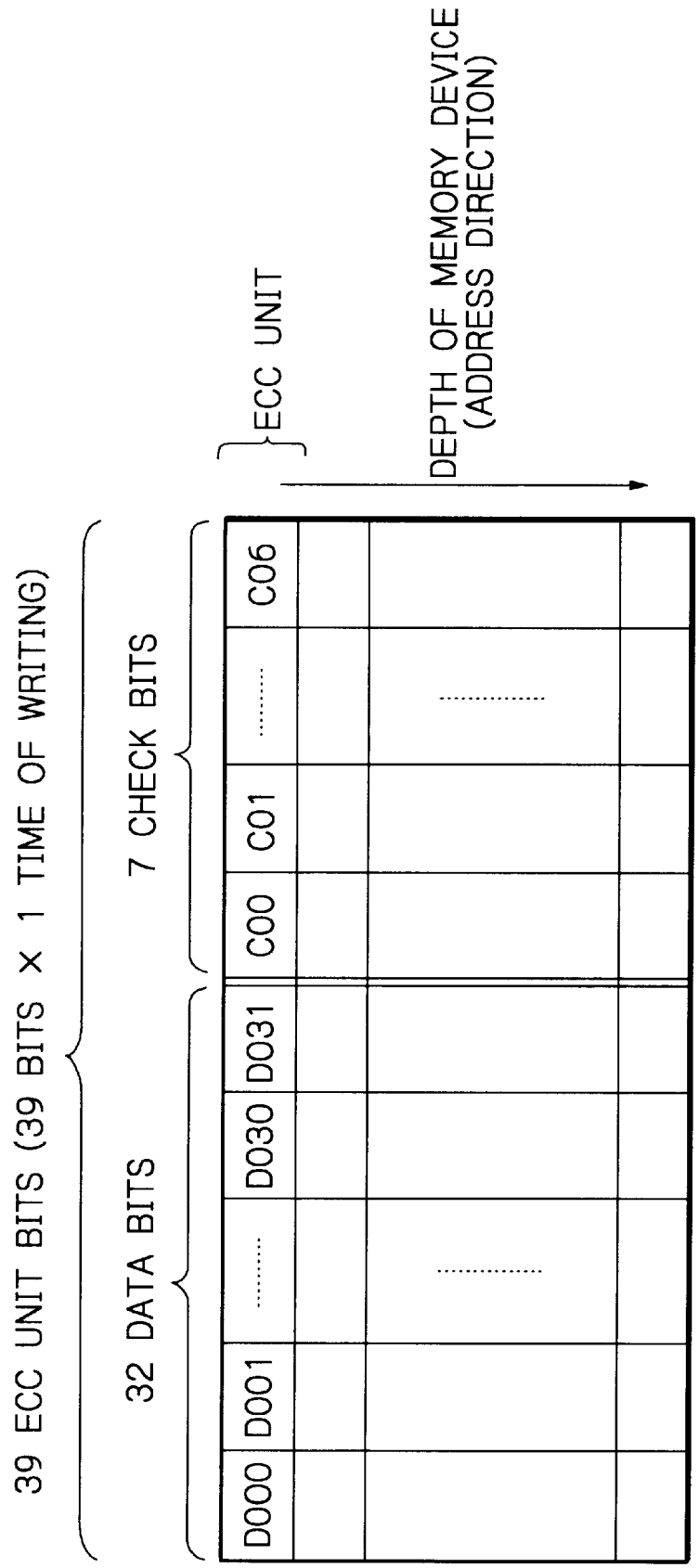
FIG. 5 shows a specific arrangement of data stored in a memory device included in the illustrative embodiment (one time of continuous transfer)
Figure 6:
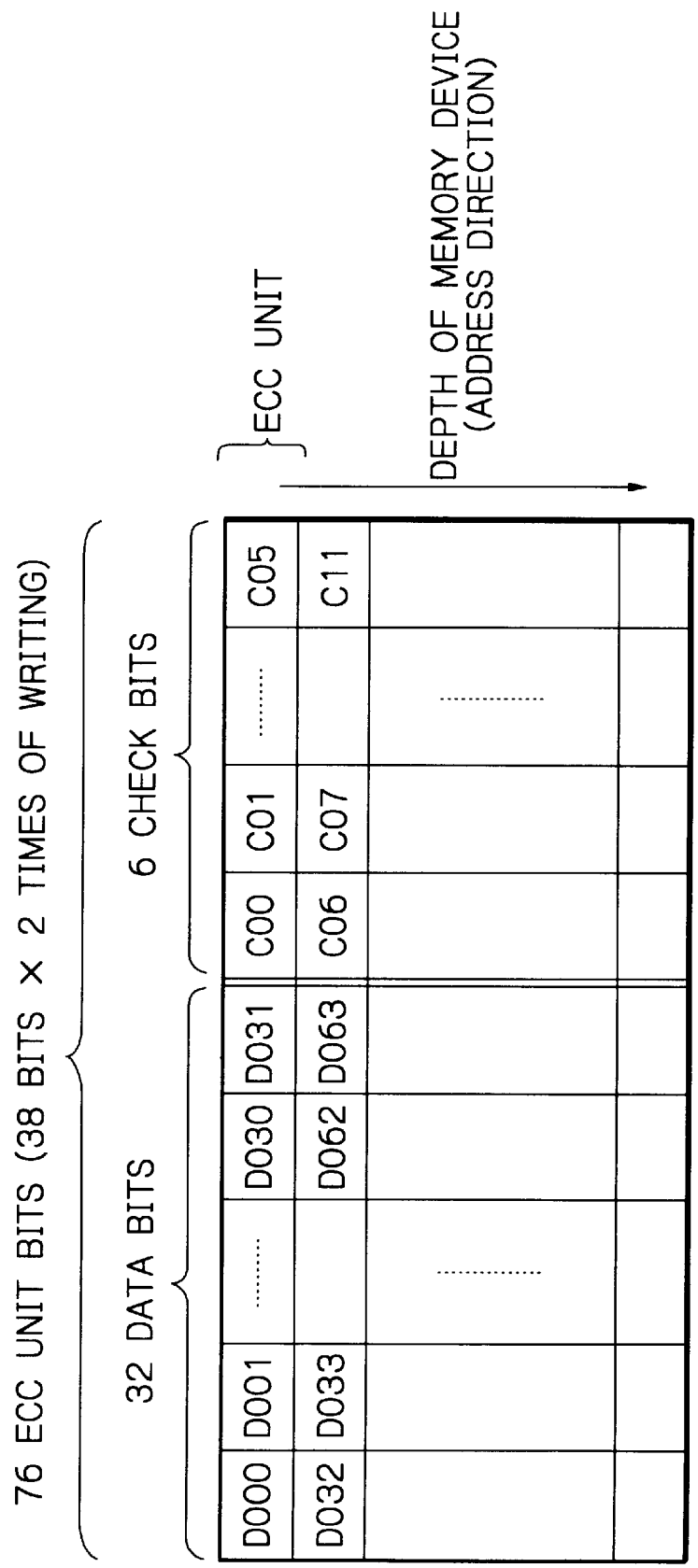
FIG. 6 shows a specific arrangement of data stored in the memory device (two times of continuous transfer)

FIG, 5 shows a specific arrangement of data in a memory device for the one time of continuous transfer. As shown, data bits D000–D031 are thirty-two bits constituting a unit data length. Seven check bits (C00–CO6) of an ECC are added to the above thirty-two data bits D000-C031, constituting an ECC unit for the SEC-DED system As FIG. 5 indicates, seven check bits are necessary for the SEC-DED ECC system. FIGS. 6 and 7 respectively show a specific data arrangement for the two times of continuous transfer and a specific data arrangement for the four times of continuous transfer. As shown in FIG. 5, when continuous transfer is effected only once, the fault of a single memory device may destroy one bit of stared data. By contrast, in the case of two times of continuous transfer (FIG. 6), data are written twice to the same memory device, so that two bits of data are possibly destroyed by the fault of a single memory device. Likewise, in the case of four times of continuous transfer (FIG. 7), four bits of data are possibly destroyed by the fault of a single memory device.

When the error detection/correction scheme of the above embodiment is used, it is necessary to adaptively change the ECC system, i.e., up to which bit correction/detection is allowed in accordance with the number of times of ECC-by-ECC continuous transfer. While the memory device 4 is assumed to have a single bit, it will be apparent that even when the device 4 has a plurality of bits, the present invention is practicable if an adequate ECC system is selected by taking account of the range to which the error of a single memory device extends.

In summary, in a system for detecting or correcting the errors of data stored in a storage using an SDRAM, DRAM with EDO or similar memory device leaving a continuous transfer function, the present invention is capable of reducing hardware (number of memory devices) for a single ECC without degrading the transfer ability of the storage, while preserving an error detecting/correcting function for the full recovery of a single memory device from faults. Specifically, when an ECC is written to the continuous addresses of a memory device by the continuous transfer function of the device, the number of check bits is reduced relative to the number of ECC-based data bits due to an increase in the number of data bits, as apparent from the code theory aspect. This successfully reduces a unit data length to be written and read and including N equally divided ECC code parts. In addition, read/write addresses can be controlled without the intermediary of software, so that the transfer function of the storage is preserved. For example, when thirty-two bits are continuously written twice, then an ECC for 32×2=64 bits has twelve bits. When an ECC is added to each thirty-two bits sequence, the resulting ECC has fourteen bits or two bits greater than twelve bits.

Moreover, in a system for detecting/correcting the errors of data stored in a storage using a memory device with multiple bits, the present invention is capable of remedying the faults or a single memory device without increasing the number of memory devices, compared to the conventional technology of the type spreading data to different ECC units. Specifically, when the number of ECC-based data bits is small, it has been customary to noticeably increase the number of check bits for the error detection/correction of a plurality of bits. By contrast, in accordance with the present invention, an ECC is written to the continuous addresses of a memory device by the continuous transfer function of the device, as stated above. This successfully increases the ratio of the number of data bits to the number of check bits for a single ECC.

Various modifications will become possible for those skilled in the art after receiving the teachings of the present disclosure without departing from the scope thereof.

What is claimed is:

1. A storage generating an ECC for data and adding said ECC to said data to thereby form a read/write unit comprising:

a read/write device generating an extended ECC corresponding to multiple bits of data, equally dividing the extended ECC into N ECC code parts, and adding the ECC code parts to N respective portions of the multiple bits of data such that a combination of data and ECC are folded a plurality of times to thereby constitute N read/write units, said read/write device operative for continuously writing and reading out of N continuous addresses of a memory device.

2. A storage generating an ECC for data and adding said ECC to said data to thereby form a read/write unit, comprising:

a writing device for generating an extended ECC corresponding to multiple bits of write data received from a host, equally dividing the extended ECC into N equally divided ECC code parts, and adding the ECC code parts to N respective portions of the multiple bits of write data, to thereby form N write units, and writing said N write units to N continuous addresses of a semiconductor memory device, respectively; and a reading device for gathering said N equally divided ECC code parts contained in N read data units read out of said N continuous addresses of said semiconductor memory device to thereby reconstruct said ECC, and correcting errors of said N read data units with said reconstructed ECC, wherein a combination of data and ECC are folded a plurality of times.

3. The storage as claimed in claim 2, wherein said writing device comprises:

N write data registers for respectively storing said N respective portions of the multiple bits of write data received from the host;

an ECC circuit for generating an ECC for said multiple bits of write data stored in said N write data registers; and a selector for selecting said N equally divided ECC code parts to append same to said N respective portions of the multiple bits of write data, to thereby form said write units, and writing said write units to said N continuous addresses of said semiconductor memory device.

4. The storage as claimed in claim 2, wherein said reading device comprises:

N read data registers for respectively reading said N read data out of said N continuous addresses of said semiconductor memory device and storing said Nread data;

an error detecting circuit for reconstructing said ECC from said Nequally divided code parts output from said N read data registers to thereby detect error bit information relating to said tread data units; and an error correcting circuit for equally dividing said read data units corrected by said error correcting unit into Nparts, and sending said Nparts continuously to a host.

5. The storage as claimed in claim 2, wherein said semiconductor memory device comprises an SDRAM or a DRAM with an EDO.

6. A storage for generating an ECC for data and adding said ECC to said data to thereby form a read/write unit, said storage comprising:

a reading/writing device for generating an extended ECC having an N-bit error correcting function that uses N bits of the data and adaptive to N times of transfer, adding N equally divided parts of said ECC to said data such that a combination of data and ECC are folded a plurality of times to thereby produce read/write units, and continuously writing or reading said read/write units in N continuous addresses of a semiconductor memory device.

7. The storage as claimed in claim 6, wherein said reading/writing device comprises:

a writing device for generating said ECC by using N bits of multiple bits of write data received from a host as entire data, and writing said write units in said N consecutive addresses of said semiconductor memory device; and a reading device for gathering said N equally divided ECC code parts contained in said unit data read out of said N continuous addresses of said semiconductor memory device to thereby reconstruct said ECC, and correcting errors of said N read data units with said reconstructed ECC.

8. The storage as claimed in claim 7, wherein said writing device comprises:

N write data registers for respectively storing said N bits of said multiple bits of write data received from the host;

an ECC circuit for generating an ECC for said N bits of said multiple bits of write data stored in said N write data registers; and a selector for adding said N equally divided parts of said ECC to said write data to thereby produce said write units and writing said write units in said N continuous addresses of said semiconductor memory device.

* * * * *